US008766874B2

(12) United States Patent
Sinnett et al.

(10) Patent No.: US 8,766,874 B2
(45) Date of Patent: *Jul. 1, 2014

(54) IN-PLANE RFID ANTENNA

(71) Applicants: Compagnie Generale des Etablissements Michelin, Clermont-Ferrand (FR); Michelin Recherche et Technique S.A, Granges-Paccot (CH)

(72) Inventors: Jay Clifford Sinnett, Greenville, SC (US); Harold James, Greenville, SC (US)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/899,166

(22) Filed: May 21, 2013

(65) Prior Publication Data
US 2013/0299597 A1    Nov. 14, 2013

Related U.S. Application Data

(63) Continuation of application No. 12/937,741, filed as application No. PCT/US2008/061834 on Apr. 29, 2008, now Pat. No. 8,462,077.

(51) Int. Cl.
*H01Q 1/36*  (2006.01)

(52) U.S. Cl.
USPC ... 343/895; 343/793; 340/572.7; 340/426.33; 340/447

(58) Field of Classification Search
CPC ...... H01Q 1/2241; H01Q 1/2225; H01Q 1/36
USPC ............. 343/895, 793; 152/152.1; 340/572.7, 340/426.33, 447
See application file for complete search history.

(56) References Cited

U.S. PATENT DOCUMENTS

| | | | |
|---|---|---|---|
| 6,198,440 B1 | 3/2001 | Ha et al. |
| 6,836,253 B2 | 12/2004 | Strache et al. |
| 7,102,499 B2 | 9/2006 | Myatt |
| 7,196,617 B2 | 3/2007 | Sinnett et al. |
| 7,330,158 B2 | 2/2008 | Harihara |

(Continued)

FOREIGN PATENT DOCUMENTS

| | | |
|---|---|---|
| JP | 2007049351 A | 8/2005 |
| WO | WO 2006/098710 | 9/2006 |

OTHER PUBLICATIONS

PCT International Search Report for PCT/US2008/061834, dated Jul. 14, 2008.

*Primary Examiner* — Dieu H Duong
(74) *Attorney, Agent, or Firm* — Dority & Manning, P.A.

(57) ABSTRACT

Disclosed is an apparatus and methodology for providing an RFID device for integration into a tire. A printed circuit board (PCB) is provided with notches in opposed ends of the PCB that are provided with guide portions as a part of the notches that function as threads to guide an end portion of a matching single pitch helical antenna into appropriately placed vias on the PCB. Threading of the helical antenna is assisted by use of an assembly jig having antenna guiding channels and PCB retaining positioning elements.

10 Claims, 3 Drawing Sheets

(56) References Cited

U.S. PATENT DOCUMENTS

| | | |
|---|---|---|
| 7,394,438 B2 | 7/2008 | Forster et al. |
| 8,462,077 B2 * | 6/2013 | Sinnett et al. ............... 343/895 |
| 2004/0189456 A1 | 9/2004 | Myatt |
| 2007/0040688 A1 | 2/2007 | Cocita et al. |
| 2007/0183184 A1 | 8/2007 | Nakamura et al. |
| 2007/0222700 A1 | 9/2007 | De Flavils et al. |
| 2007/0274030 A1 | 11/2007 | Robert |
| 2008/0192451 A1 | 8/2008 | Sinnett et al. |

\* cited by examiner

IN-PLANE RFID ANTENNA

FIELD OF THE INVENTION

The present subject matter is directed to RFID (Radio Frequency Identification) devices for integration into tires. More particularly, the present subject matter relates to RFID apparatus and methodologies for providing improved antenna connection configurations for such devices.

BACKGROUND OF THE INVENTION

Electrical circuits are used in a variety of environments that can present particular physical, chemical, and electrical factors for which the circuit must either be protected or be designed to endure. The present invention primarily concerns physical factors such as mechanical stress leading to fatigue, which in turn can cause a circuit malfunction by physically breaking or weakening a specific part of the circuit. A typical location for such malfunction is at or near the point of connection of a wire, lead, or other conductor to an electrical circuit. In circumstances where the wire and the connected-to circuit may move or rotate relative to one another, the wire may incur a concentration of mechanical stress and/or fatigue at or near the point of connection to the circuit. Mechanical stresses such as repeated bending or twisting, for example, can lead to a weakening of the wire until a break occurs.

Electronics integrated within a tire or other product offer potential advantages such as asset tracking and measurement of physical parameters as, for example, temperature and pressure. For purposes of the present disclosure, the phrase 'integrated within a tire' denotes any association of an electronics device with a tire including, but not limited to, encased or adhered entirely or partially within or to any portion of the tire, or attached to an inner or outer surface of the tire.

Often many of these systems rely on a wireless data link to communicate with an information system outside of the vehicle. Such information systems may include, as non-limiting examples, on-board computer systems, drive-by interrogators, or hand-held interrogators. In addition, the types of data communicated over such wireless data links are wide and varied and include such as not only the previously mentioned temperature and pressure but also other physical parameters such as tire rotation speed as well as data corresponding to manufacturing data and a host of other information. What ever the type of data transmitted, the wireless data link requires an antenna to be attached to the electronics in the tire. If the electronics and/or antenna are adhered to the tire rubber, flexing of the tire, either due to the tire building process or normal use can cause the antenna to separate from the electronics due to cracking, breaking, or fatigue.

U.S. Pat. No. 7,196,616 (Sinnett et al.) discloses apparatus and methodology for providing a graduated stiffness, strain-resistant electrical connection. A material is configured around the lead and near the point of connection to the circuit so as to create a region of decreasing flexibility or graduated stiffness near the point of connection. Another example of a tire electronics system can be found in U.S. Pat. No. 7,102,499 (Myatt), which concerns an electronic communications device for a tire that includes a radio device and an antenna to be attached to or embedded in a tire.

U.S. Patent Application Publication No. US 2007/0274030 A1 (Robert) also relates to tire electronics, and more particularly discloses an electronic module designed to be incorporated in a tire comprising a functional device, a support and at least one device for electrically connecting a wire and a device for mechanically fixing the wire, separate from the electrical connection device, for mechanically fixing the wire to the support.

The PCT Application published as International Publication Number WO 2006/098710 A1 (Sinnett et al.) is directed to a strain-resistant electrical connection for coupling an antenna or other conductive lead to a circuit. This published application describes a technique similar to that described with reference to the known devices illustrated herein in FIGS. 2A and 2B and described later in comparison to the present subject matter.

Other similar subject matter is described in JP2007049351A entitled "Electronic Tag For Tire And Pneumatic Tire" as an electronic tag with a coil-shaped antenna connected to an integrated circuit chip. The coil-shaped antenna includes dual pitch wound portions with the higher pitch winding coupled to the integrated circuit chip. U.S. Pat. No. 6,836,253 B2 (Strache et al.) describes a transmitter or receiver unit for building into elastic structures including tires. The unit may include an antenna taking several forms including a coiled-wire configuration.

While various implementations of tire electronics devices such as RFID devices in tire electronic systems have been developed, and while various methodologies have been developed to relieve stress at electrical coupling points, no design has emerged that generally encompasses all of the desired characteristics as hereafter presented in accordance with the present technology.

SUMMARY OF THE INVENTION

In view of the recognized features encountered in the prior art and addressed by the present subject matter, improved apparatus and methodology for providing an improved antenna configuration and electrical connection thereof for RFID devices has been provided.

In an exemplary configuration, an RFID device for integration into a tire, has been provided comprising a printed circuit board (PCB) having top and bottom surfaces delineated by opposed end portions and opposed side portions, a plurality of conductive traces on the top surface of said PCB, a notch formed in one end of the PCB, a plated through via piercing the PCB from the top surface to the bottom surface, a conductive trace element surround the via at the top surface of the PCB, the trace element electrically coupled to the plurality of conductive traces, a conductive solder pad surrounding said via at the bottom surface of said PCB and extending for a predetermined distance in the direction of the side portions of the PCB, and an antenna element having an end portion positioned within the notch and within a plane defined by the top surface of the PCB, wherein a portion of the end portion passes through the via from the top surface to the bottom surface and is electrically connected to the conductive trace element surround the via at the bottom surface of the PCB.

In accordance with aspects of certain embodiments of the present subject matter, methodologies are provided for assembling an RFID device comprising providing a printed circuit board (PCB) having top and bottom surfaces, opposed end portions, and opposed side portion, providing a single pitch helical antenna element, forming notches in the opposed end portions such that portions of the notches are configured as guide portions having pitches corresponding to the single pitch of the helical antenna element, providing plated through vias in the PCB positioned to correspond to the pitch of the single pitch helical antenna element, providing an assembly jig comprising support and retaining structures for the PCB, providing antenna supporting channels in a surface of the assembly jig, retaining the PCB on the assembly jig with the bottom surface exposed, placing an antenna element in a support channel, threading an end portion of the antenna element through a via in the PCB by rotating and advancing the antenna element within the support channel, and soldering the end portion of the antenna to a portion of the plated through via on the bottom surface of the PCB to produce an assembled device.

Additional objects and advantages of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1A:
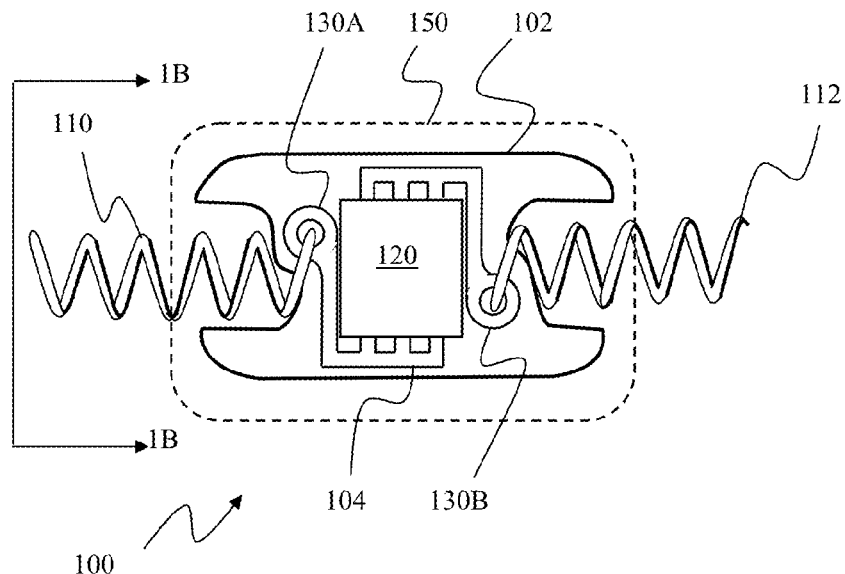
FIG. 1A illustrates a top view of an exemplary RFID device in accordance with present technology for incorporation into a tire.

Repeat use of reference characters throughout the present specification and appended drawings is intended to represent same or analogous features or elements of the invention.

DETAILED DESCRIPTION OF THE PREFERRED EMBODIMENTS

As discussed in the Summary of the Invention section, the present subject matter is particularly concerned with apparatus and methodologies for providing an improved antenna configuration and electrical connection thereof for RFID devices.

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Reference will now be made in detail to the presently preferred embodiments of the subject RFID device. Referring now to the drawings, FIG. 1 illustrates a top view of an exemplary RFID device 100 constructed in accordance with present technology for incorporation into a tire. Those of ordinary skill in the art will appreciate that while the device described herein has particular use in relation to tire technology, such is not a limitation of the device itself as such device may be employed with other technologies as well where damage may occur to the device or to the electrical connections as a function of induced stress. A shipping pallet or container for moving goods that may be identified by way of the RFID device 100 is one such example.

As may be seen from FIG. 1A, RFID device 100 includes a printed circuit board (PCB) 102 on which is provided a number of conductive traces 104. An integrated circuit (IC) device 120 is mounted to PCB 102 in conventional manner and is electrically connected to traces 104 and, via portions 130A, 130B of traces 104 to antenna elements 110, 112. It should be appreciated that the illustrated antenna elements 110, 112 are not drawn to scale and are intended to be extended following the illustrated helical form to a length corresponding to at least approximately the resonant frequency of the RFID system.

Figure 1D:
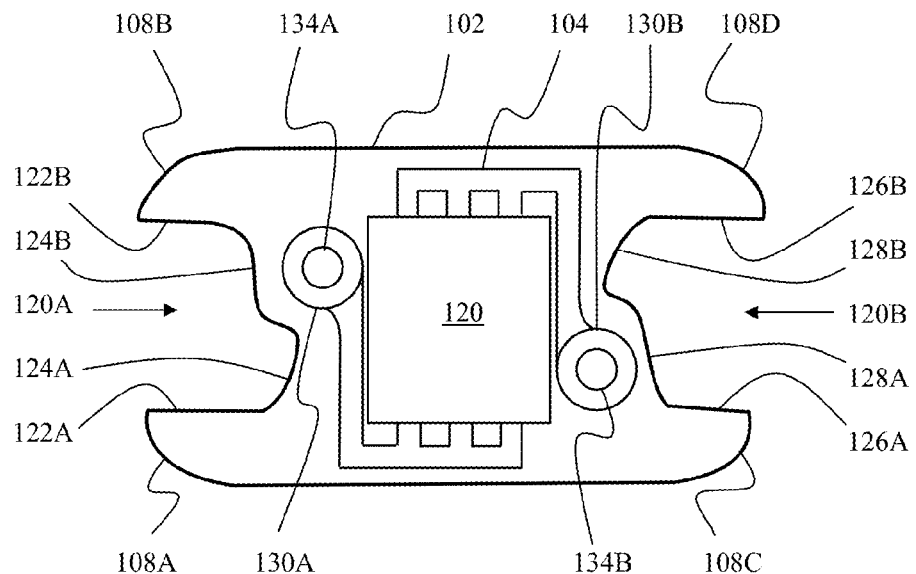
FIG. 1D illustrates a printed circuit board (PCB) in accordance with the present technology in enlarged view to illustrate unique aspects of the PCB.
Figure 1B:
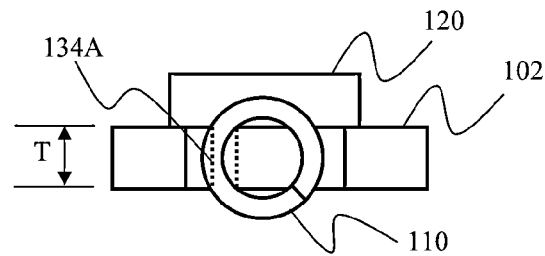
FIG. 1B illustrates an end view of the RFID device in enlarged scale taken from the viewpoint of arrows 1B-1B of FIG. 1A.
Figure 1C:
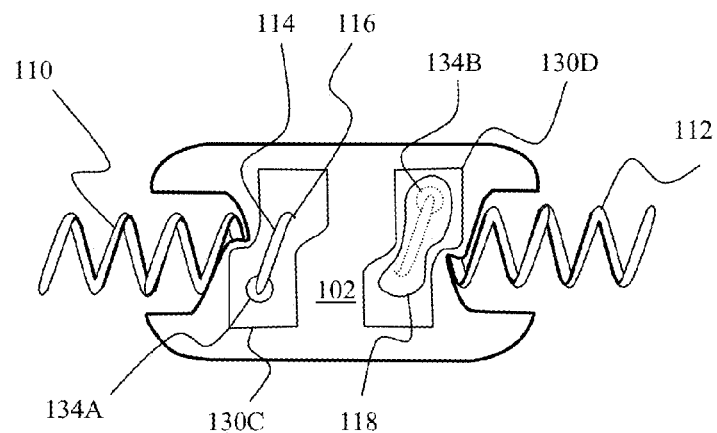
FIG. 1C illustrates a bottom view of the device of FIG. 1A.

Trace 104 portions 130A, 130B surround plated through vias 134A, 134B (FIGS. 1C and 1D) that pass through PCB 102 and connect to a pair of solder pads 130C, 130D on the bottom surface of PCB 102 (FIG. 1C). As best illustrated in FIG. 1C, end portion 114 of helical antenna element 112 continues in an unbroken pattern through the via-holes 134A, 134B and around until it touches (at 116 on solder pad 130C) solder pads 130C, 130D that extend substantially between the side portions of PCB 102 on the bottom of PCB 102. When end portion 114 of helical antenna element 112 touches solder pad 130C, it may be bonded to the solder pad such as by soldering as representatively illustrated at 118. Of course, in final assembly both antennas are bonded, for example by soldering to both solder pads. The connection to solder pad 130C has been shown prior to soldering to better illustrate the touching of the end of the antenna to the solder pad prior to soldering.

Bonding antenna portions 110, 112 to PCB 102 in this manner achieves significant improvement over similar devices in that such bonding of the antenna coiled wire helps to prevent delamination of the trace conductors on the surface of PCB 102. In addition, soldering antenna elements 110, 112 on the side of PCB 102 opposite IC chip 120 significantly reduces the chances of excess solder and of solder wicking down the similar previously known antenna helix 210, 214, 212, 216 as illustrated in FIG. 2A.

Addition benefits derive from attaching the antenna elements in this manner. For example, significant savings are achieved in cost and convenience over the attachment techniques previously used such as illustrated in FIG. 2A. As illustrated in FIG. 2A, dual pitch, individually wound antenna elements as illustrated at 210, can now be replaced with longer single pitch coils that may be cut to length at assembly time.

Figure 2B:
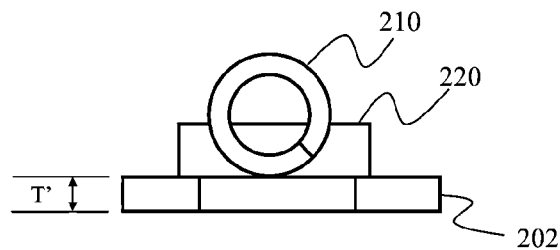
FIG. 2B illustrates an end view of the RFID device of FIG. 2A in enlarged scale taken from the viewpoint of arrows 2B-2B of FIG. 2A.
Figure 2A:
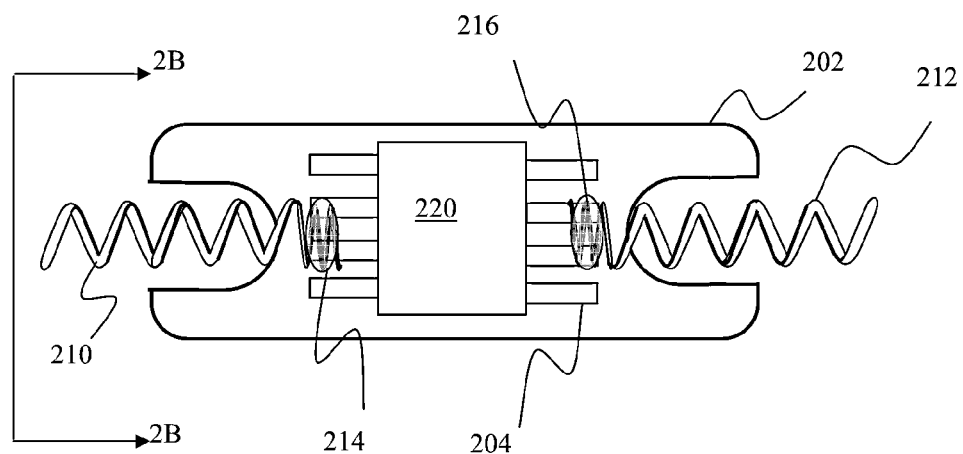
FIG. 2A illustrates a known RFID device for comparison with the present technology.

The previously known design illustrated in FIGS. 2A and 2B employed a dual pitch antenna helix configuration where higher pitch portions 214, 216 were provided to assist in soldering the antenna elements to conductive traces 204. Such placement of the previously known antenna elements where the outer surface of the antenna helix was in contact with and soldered to the upper surface of PCB 202 produced a device having a thickness of the outer diameter (OD) of the spring used as an antenna plus the thickness T' of the PCB 202.

Such thickness produced, in exemplary known configurations, a rigid zone between the antenna attachment points of 7 mm. In a tire environment, this causes the buildup of excess strain along the length of the rigid zone that must be accommodated off the ends of the PCB. Such accommodation of excess strain is believed to be one cause for fatigue failures of the antenna. By contrast, and in accordance with present technology, by relocating the antenna attachment point to the opposite sided of the PCB 102 the rigid distance between antenna attachment points may be reduced to only about 3 mm, resulting in an improvement of 57%.

In addition, such placement of the attachment point of the previously used dual pitch helical antenna elements produced a device with an indeterminate location for the free end of the helical element in rotation. This placement allowed for the possibility that such end might be away from the PCB and create a harmful sharp point. In accordance with present technology, an end portion of the helical antenna element is located in a plated through hole or via so that the end of the antenna is in a well-controlled position, adjacent to the PCB and unable to create a sharp point.

Further still, by designing PCB 102 such that antenna elements 110, 112 may be placed within the plane of PCB 102 multiple advantages can be realized. First, a device can be provided with a total thickness equal to or only slightly larger than the OD of the antenna coil. Second, by redesigning the PCB 102 with shaped features that define the location of the helical spring antenna wire, alignment with the holes 134A, 134B for easy assembly is achieved. Third, by placing the antenna elements within the plane of PCB 102 and, more specifically, between arm portions 108A-108D, a graduated stiffness of the electrical connection is achieved through the synergistic cooperation of the arms, antenna element and a non-conductive elastomeric material 150 (FIG. 1A) between the arms and enveloping the antenna element as well as embedding all parts of the assembled device. In an exemplary embodiment, all portions of the assembled device may be coated with a bonding agent such as Chemlok® available from LORD Corporation, prior to embedding the assembled device in the non-conductive elastomeric material. Fourth, placing the antenna within the plane of the PCB 102 allows an opportunity to increase the thickness T (FIG. 1B) of PCB 102 to thereby provide a stronger assembled device than that of previously known devices such as illustrated in FIG. 2B having a PCB 202 with less thickness T'.

With further attention to FIG. 1D, it will be seen that PCB 102, in accordance with present technology, is provided with notched portions 120A, 120B between arms 108A, 108B and 108C, 108D, respectively, that are somewhat similar to the arm portions illustrated in FIG. 2A. The notch portions 120A, 120B according to present technology, however, are configured to provide curved shaped portions 124A, 124B between linear regions 122A, 122B on one end of PCB 102 and similar curved shaped portions 128A, 128B between linear regions 126A, 126B on the other end of PCB 102 that define the location of the helical spring wire antenna elements 110, 112. In particular, shaped notch portions 120A, 120B are designed to correspond to the pitch of the helical antenna elements 110, 112 so that the antenna helix may be easily threaded into mating holes, i.e., plated through vias 134A, 134B in PCB 102. Such threading is further facilitated during assembly by the use of a specially designed assembly jig 300 (FIG. 3).

Figure 3:
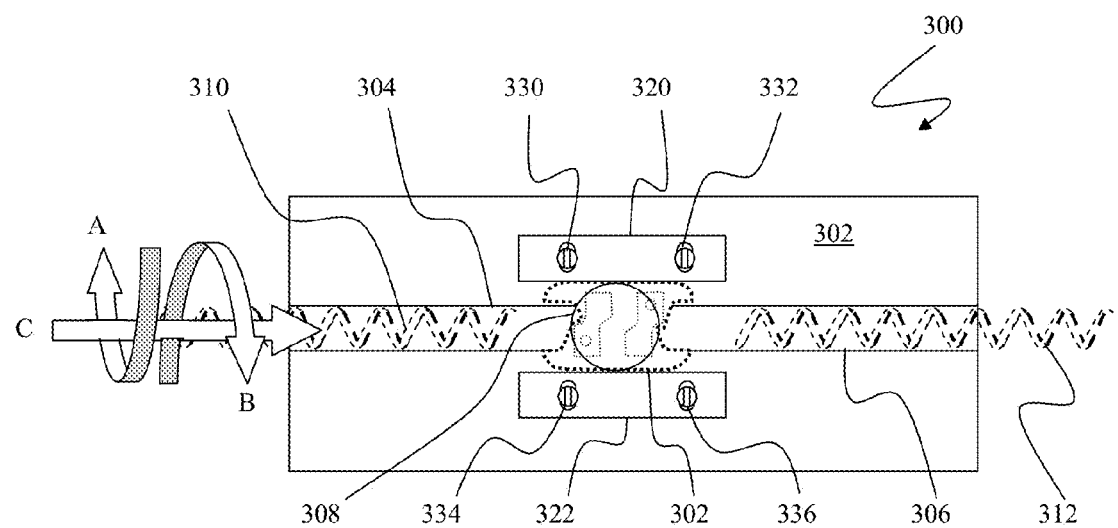
FIG. 3 illustrates an exemplary assembly methodology for the device of the present subject matter illustrating the use of an alignment jig assembly.

With reference now to FIG. 3, there is illustrated an exemplary assembly jig 300 and illustrated methodology for assembly of the RFID device of the present subject matter. As may be seen in FIG. 3, assembly jig 300 corresponds to a support block 302. Support block 302 may correspond to any suitable material able to be machined and withstand a soldering operation without physical damage. In an exemplary device, support block 302 may be made of aluminum. Support block 302 includes an upper surface into which aligned channels 304, 306 running down a centerline of support block 302 may be machined. Channels 304, 306 may have various cross sections, but a preferred cross section is a semicircular cross section of a diameter approximately that of the OD of antenna elements 110, 112.

Support block 302 also has provided thereon adjustable positioning devices 320, 322 for securing PCB 102 to support block 302. Positioning devices 320, 322 may be made of any suitable material. As exemplarily illustrated in FIG. 3, positioning devices 320, 322, may have provided therein, for example, elongated slots and may be adjustably positioned relative to channels 304, 306 and secured in place by screws 330, 332, 334, 336 or by any other suitable fixing means.

Between channels 304 and 306, and between positioning device 320, 322 a recess or well 308 may be provided sized to accommodate IC device 120, if mounted, on PCB 102. For assembly, PCB 102 is turned upside down so that IC 120, if mounted, may be positioned so as to enter recess 308 and positioning devices 320, 322 are adjusted to secure PCB 102 in place. After securing PCB 102 to support block 302, antenna elements 310, 312 are placed in channels 304, 306. Note that antenna elements 310, 312 and PCB 102 are illustrated in phantom in FIG. 3 for clarity of illustration.

Following placement of antenna element 310 in channel 304, antenna element 310 may be rocked back and forth as illustrated by arrows A, B while being advanced in the direction of arrow C until such time as the end portion of antenna element 310 first entering notch 120A (PCB 102 portions are best seen in FIG. 1D) abuts shaped portions 124A, 124B of PCB 102. Shaped portion 124A, 124B will then guide the end of the antenna helix into plated through via 134A by virtue of the matching pitches of shaped portions 124A, 124B, antenna element 310 and position of plated through via 134A. After the end portion of antenna element 310 enters via 134A of the upside down positioned PCB 102, the antenna continues in an unbroken pattern through the via hole and around until it touches the solder pad 130C where it may then be soldered in place as previously explained with reference to FIG. 1C. This process is repeated for antenna element 312 until it is soldered in place to solder pad 130D.

After soldering both antenna elements in place, the assembled device may be coated with a bonding agent and sealed within non-conductive elastomeric material coating 150 as illustrated in FIG. 1A. It should be appreciated that assembling the RFID device in this manner produces a synergistic effect such that the bonding of the PCB and the antenna to the elastomeric material creates a device where the whole is greater than the sum of the parts.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An RFID device for integration into a tire, comprising:
   a printed circuit board (PCB) having top and bottom surfaces delineated by opposed end portions and opposed side portions;
   a plurality of conductive traces on the top surface of said PCB;
   a notch formed in one end of said PCB;
   a plated through via piercing the PCB from the top surface to the bottom surface;
   a conductive trace element electrically coupled to said via at the top surface of said PCB, the trace element electrically coupled to the plurality of conductive traces;
   a conductive solder pad electrically coupled to the via at the bottom surface of said PCB and extending for a predetermined distance in the direction of the side portions of the PCB; and
   an antenna element having an end portion positioned within said notch, wherein a portion of said end portion passes through the via from the top surface to the bottom surface and is electrically connected to the conductive trace element coupled to said via at the bottom surface of the PCB.

2. The device of claim 1, wherein the antenna element is in the same plane as the top surface of the PCB.

3. The device of claim 1, further comprising an integrated circuit device mounted to the top surface of the PCB and electrically coupled to selected ones of the plurality of conductive traces.

4. The device of claim 1, wherein the antenna element comprises a helically wound conductor.

5. The device of claim 4, wherein the helically wound conductor is wound with a single pitch between turns.

6. The device of claim 5, wherein the notch is provided with portions matching the pitch of the helically wound conductor.

7. The device of claim 6, wherein the via is positioned within the PCB at a location corresponding to an extension of the pitch of the helically wound conductor from the matching notch portions.

8. The device of claim 1, further comprising a non-conductive elastomeric material surrounding said PCB and at least a portion of said antenna element, and filling said notch.

9. The device of claim 8, further comprising a bonding agent for securing said non-conductive elastomeric material to the antenna element and PCB.

10. The device of claim 1, further comprising a second notch positioned at the opposing end of said PCB, a second plated through via piercing the PCB and a second antenna positioned within said second notch and in the plane defined by the top surface of the PCB.

* * * * *